(12) United States Patent
Mudd, II

(10) Patent No.: US 9,067,278 B2
(45) Date of Patent: Jun. 30, 2015

(54) PULSE SPREAD LASER

(71) Applicant: Photon Automation, Inc., Newburgh, IN (US)

(72) Inventor: Richard E. Mudd, II, Frankfort, IN (US)

(73) Assignee: Photon Automation, Inc., Newburg, IN (US)

(*) Notice: Subject to any disclaimer, the term of this patent is extended or adjusted under 35 U.S.C. 154(b) by 330 days.

(21) Appl. No.: 13/853,612

(22) Filed: Mar. 29, 2013

(65) Prior Publication Data

US 2014/0291304 A1   Oct. 2, 2014

(51) Int. Cl.
*B23K 26/20* (2014.01)
*B23K 26/32* (2014.01)
*B23K 26/08* (2014.01)
*B23K 26/24* (2014.01)

(52) U.S. Cl.
CPC ............ *B23K 26/0807* (2013.01); *B23K 26/32* (2013.01); *B23K 26/20* (2013.01); *B23K 26/24* (2013.01)

(58) Field of Classification Search
CPC .......... B23K 26/0006; B23K 26/0626; B23K 26/0807; B23K 26/20; B23K 26/32
USPC ........................ 219/121.61–121.64, 121.83
See application file for complete search history.

(56) References Cited

U.S. PATENT DOCUMENTS

| 3,585,350 | A |   | 6/1971  | Voytko |            |
|-----------|---|---|---------|--------|------------|
| 4,330,699 | A |   | 5/1982  | Farrow |            |
| 4,577,088 | A |   | 3/1986  | Sharp  |            |
| 4,975,558 | A | * | 12/1990 | Lukens et al. | 219/124.34 |
| 5,506,386 | A | * | 4/1996  | Gross | 219/121.64 |
| 5,595,670 | A | * | 1/1997  | Mombo-Caristan | 219/121.64 |
| 5,841,097 | A | * | 11/1998 | Esaka et al. | 219/121.63 |
| 5,961,858 | A | * | 10/1999 | Britnell | 219/121.63 |
| 6,091,749 | A | * | 7/2000  | Hoffmaster et al. | 372/38.02 |
| 6,329,629 | B1 |  | 12/2001 | Grewell |         |
| 6,489,985 | B1 |  | 12/2002 | Brodsky et al. |  |
| 6,521,861 | B2 |  | 2/2003  | Jones  |            |
| 6,548,191 | B2 |  | 4/2003  | Osame  |            |
| 6,584,378 | B1 |  | 6/2003  | Anfindsen |         |
| 6,596,962 | B2 |  | 7/2003  | Haschke |          |
| 6,818,857 | B1 | * | 11/2004 | Cho et al. | 219/121.64 |
| 7,018,260 | B2 |  | 3/2006  | Kawamura |          |
| 7,187,110 | B2 |  | 3/2007  | Suzuki |            |
| 7,283,892 | B1 |  | 10/2007 | Boillot |           |
| 7,421,314 | B2 |  | 9/2008  | Stoddard |          |
| 7,470,487 | B2 |  | 12/2008 | Tomimoto |          |
| 7,557,495 | B2 |  | 7/2009  | Tinwell |           |
| 7,723,640 | B2 |  | 5/2010  | Caldwell |          |
| 7,807,939 | B2 |  | 10/2010 | Nagashima |         |

(Continued)

OTHER PUBLICATIONS

PCT International Search Report/Written Opinion, PCT/US14/32158, dated Oct. 7, 2014.

(Continued)

*Primary Examiner* — Samuel M Heinrich
(74) *Attorney, Agent, or Firm* — Overhauser Law Offices LLC

(57) ABSTRACT

A system and method for precision welding using a fiber laser is disclosed in which varying intensity laser pulses are spread across the material junction in a number of high aspect ratio areas. The power density applied along each area is varied to accommodate differences in the material characteristics of each material while allowing for the creation of a more uniform weld pool alloy.

22 Claims, 9 Drawing Sheets

(56) References Cited

U.S. PATENT DOCUMENTS

| | | |
|---|---|---|
| 7,851,984 B2 | 12/2010 | Zdeblick |
| 7,858,900 B2 | 12/2010 | Orye |
| 7,977,620 B2 | 7/2011 | Nishio |
| 8,164,024 B2 | 4/2012 | Sohn |
| 8,304,687 B2 | 11/2012 | Amorosi |
| 2002/0117485 A1 | 8/2002 | Jones |
| 2006/0000812 A1 | 1/2006 | Weber et al. |
| 2007/0164004 A1 | 7/2007 | Matsuda et al. |
| 2007/0221638 A1 | 9/2007 | Yoshikawa |
| 2010/0032413 A1* | 2/2010 | Brenner et al. ............ 219/75 |
| 2010/0118899 A1 | 5/2010 | Peng et al. |
| 2011/0278265 A1 | 11/2011 | Kessler |
| 2013/0178952 A1* | 7/2013 | Wersborg et al. ............ 700/47 |
| 2013/0327749 A1* | 12/2013 | Denney et al. .......... 219/137 PS |

OTHER PUBLICATIONS

P.W. Fuerschbach and G.R. Eisler, Effect of laser spot weld energy and duration on melting and absorption, Science and technology of Welding and Joining, 2002, vol. 7, No. 4.

Hana Chmelickova and Hana Sebestova, Pulsed Laser Welding, www.itechopen.com, 2012.

Quintino, L., Costa, A., Miranda, R., Yapp, D., Welding with high power fiber lasers—a preliminary study. 2008.

Shannon, Geoff, Fiber Laser Micro Welding: Single Mode or Multi Mode?, Miyachi Unitek Blog, http://info.miyachiunitek.com/blog/bid/132560/Fiber-Laser-Micro-Welding-Single-Mode-or-Multi-Mode, Feb. 17, 2013.

Laser Micro Welding, http://www.kjlasermicromachining.com/capabilities/laser-micro-welding, Feb. 17, 2013.

\* cited by examiner

Weld Path Movement Setup (Galvo)

Pulse Setup

PULSE SPREAD LASER

BACKGROUND

The present invention relates to laser control systems, and more particularly, but not exclusively, to laser welding systems in which the power density is dynamically varied based on the beam's position on the parts to be welded.

One of the most difficult challenges to laser welding two materials together compensating for different melting points or thermal characteristics in the materials. The typical approach to welding materials with dissimilar melting points or of different thicknesses is to apply more energy to the material with the higher melting point. This has traditionally been done by moving the laser beam parallel to the weld junction with the center of the laser beam offset from the weld junction. Due to this offset, more of each laser spot lands on one side of the weld junction than the other, and thus a correspondingly greater proportion of the laser energy from each pulse is applied to the higher melting point material. However, having substantially unequal areas of each material being subject to each laser pulse typically leads to differing amounts of each material being melted into the weld pool, and a such an asymmetrical weld pool can compromise weld quality. Conversely, if the laser spot is more centered on the weld junction in an effort to melt more equal amounts of each material, there is a risk that the more fragile material would be obliterated or that there would be insufficient melting of the more durable material, which can also comprise the weld quality. Thus, selecting the proper offset that achieves the ideal distribution of energy between the two materials often must be determined through trial and error.

Since the development of nearly diffraction limited diode pumped solid state lasers and fiber lasers, it has become possible to focus the laser energy onto a greatly reduced spot size, for example, to a spot diameter about $1/10$ the size of the spot of a conventional Nd:YAG laser. This small laser spot size has made welding along a seam more challenging. The primary difficulty lies in the need to apply a sufficient amount of energy to melt each material. Due to the greatly reduced spot size, the inherent gaps between the materials becomes more significant, and it becomes nearly impossible to apply sufficient energy to each material by simply offsetting a single spot relative to the material junction, as the small spot size is not large enough to encompass a sufficient amount of each material to create an adequate weld pool.

Thus, in order to assure that appropriate amounts of energy are applied to each material, a highly focused laser beam needs to be cycled back and forth across the junction, typically in a zig zag pattern. This movement can be accomplished by moving the part relative to a stationary laser beam, or more typically, by utilizing two-dimensional beam steering optics to steer the beam in a specified pattern across the material junction. Typical beam steering optics utilize mirrors and a two-axis galvanometer steering head to steer the beam in two dimensions.

By moving a highly focused laser beam along a zig zag path that traverses the material junction, the laser energy is applied over a wider area of each material than could be accomplished by simply moving the beam parallel to the junction. However, for the same reasons the larger diameter spots of conventional Nd:YAG lasers were offset from the material junction, the zig zag pattern is also typically offset relative to the material junction such that the laser energy is applied over a greater area of the higher melting point material than of the lower melting point material, which can likewise yield an asymmetrical weld pool due to dissimilar amounts of each material being melted.

Furthermore, as the laser moves, it is typically operated so as to produce either a continuous beam or a series of short duration pulses at a specified pulse repetition rate. When the laser is operating in a pulsed mode at low to mid-frequencies up to about 5 kHz, which many precision fiber laser welding applications require, the relationship between the frequency of the zig-zag pattern and the pulse repetition rate becomes important. For example, if the zig-zag motion is operating at a frequency of 1 kHz and the pulse rate of the laser is also 1 kHz, the laser pulses will not be distributed across the desired welding zone but will instead occur at the same relative location during each pass, for example, with all pulses being in line with the material junction or all on one side or the other, depending on the point of the cycle at which the pulse train of the laser commences. Therefore, for many precision welding applications, it is typically necessary to have the pulse rate of the fiber laser be significantly greater than the period of the movement across the junction, which limits the overall welding speed for the application.

Accordingly, there is a need for improvements in this area.

SUMMARY

According to one aspect, an improved method of laser welding is provided in which a series of variable intensity laser pulses are spread across the material junction such that the power density that is applied varies in a predetermined fashion based on the beam's position on the part. By customizing the power density being spread across the material junction, a more equal amount of each material can be melted so as to create a more uniform weld pool. Furthermore, since the laser does not need to fire multiple times within each pass across the junction; the overall weld time can be significantly reduced.

In one form, a novel laser welding method involves steering a laser beam in a series of passes across the junction between first and second materials, wherein during each of the passes the laser power is applied across a continuous high aspect ratio area that traverses the junction, with each of the high aspect ratio areas comprising a first elongated area on the first material and a second elongated area on the second material. During each of the passes, the power density that is applied is varied in a predetermined manner such that one power density profile is applied to the elongated area on the first material and another power density profile is applied to the elongated area on the second material. The variations in the power density profiles may be accomplished by varying the intensity and/or speed of travel of the laser beam during each pass. The power density profiles may be customized such that the power density generally increases as the beam is approaching the material junction and the power density generally decreases as the beam is moving away from the material junction.

In another form, a novel system for applying laser energy to a workpiece, comprises, a fiber laser pulse generator operative to generate fiber laser pulses according to a user specified intensity profile upon receipt of a pulse initiation signal; beam steering optics operative to spread the laser pulses across high aspect ratio areas of the workpiece; and a controller coupled to the beam steering optics and to the pulse generator, wherein the controller is operative to send a series of pulse initiation signals to the fiber laser pulse generator that are synchronized with a series of beam steering signals sent to the beam steering optics so as to cause the laser pulses to be spread along a series of predetermined high aspect ratio areas of the workpiece. The pulse generator may be configured so as to generate different fiber laser pulses according to different user specified intensity profiles upon receipt of different pulse initiation signals. The system may further include an input device for receiving a user specified series of moves for the beam steering optics and the user specified intensity profile to be applied during specified moves in the series of moves.

In another form, a novel laser welding system for dynamically varying the laser power density applied to different sides of a material junction comprises an input device for receiving a user specified series of moves for a fiber laser beam across a material junction and one or more varying intensity profiles for the laser beam to be applied during specified moves in the series of moves; a fiber laser configured to generate a laser beam according to the one or more varying intensity profiles upon receipt of a corresponding laser initiation signal; beam steering optics for moving the generated laser beam; and a controller configured to send the laser initiation signals to the fiber laser and to operate the beam steering optics so as to move the laser beam across the junction according to the specified series of moves, wherein the laser initiation signals are synchronized with the operation of the beam steering optics such that the laser power density applied on one side of the material junction is greater than the laser power density applied on the other side of the material junction.

In another form, a novel method for laser welding comprises generating a series of varying intensity beams from a fiber laser, the beams having an asymmetrical intensity profile comprising an increasing intensity region, a central region of high intensity, and a decreasing intensity region; and spreading the series of beams across a material junction such that a majority of the increasing intensity region of each beam falls on one side of the junction and a majority of the decreasing intensity region of each beam falls on the other side of the junction. The central region of each beam may be generally aligned with the material junction. Each beam may be spread across a high aspect ratio area comprising a first elongated area on one side of the junction and a second elongated area on the other side of the junction. The elongated areas on each side of the junction may be of similar size yet receive different amounts of power to compensate for different thermal characteristics of each material.

BRIEF DESCRIPTION OF THE FIGURES

Features of the invention will be better understood from the following detailed description when considered in reference to the accompanying drawings, in which.

DETAILED DESCRIPTION OF REPRESENTATIVE EMBODIMENTS

Figure 1:
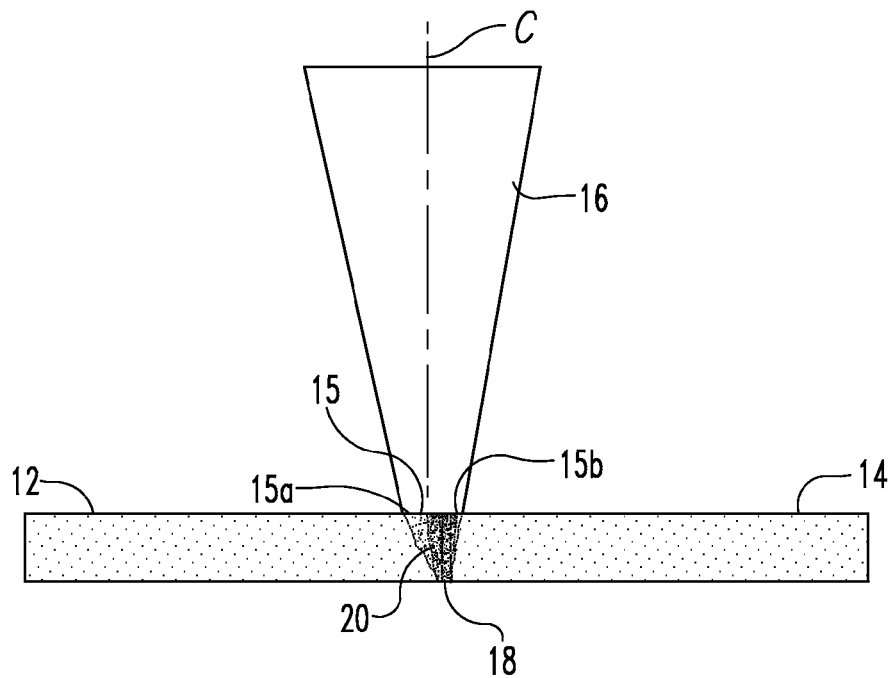
FIG. 1 is a schematic side view depicting a known method of welding dissimilar materials with the large diameter spot of an Nd:YAG laser.

While the present invention can take many different farms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

FIG. 1 is a side schematic view showing a conventional laser welding of dissimilar materials using an Nd:YAG laser 16 to weld a high melting point material 12 and a low melting point material 14. The laser beam 16 is directed so as to be incident on the junction between the two materials. The beam spot 15 is large enough to traverse the small gap 18 at the material junction with one portion 15a of the beam incident on the high melting point material 12 while another portion 15b is incident on the low melting point material 14. The center line C of the beam 16 is offset from the material junction, i.e. the gap 18, such that the portion 15a of the beam that is incident on the high melting point material 12 is larger than the portion 15b that is incident on the low melting point material 14. The resulting weld pool 20 is asymmetrical due to the fact that more of the material 12 is melted than is material 14.

Figure 2:
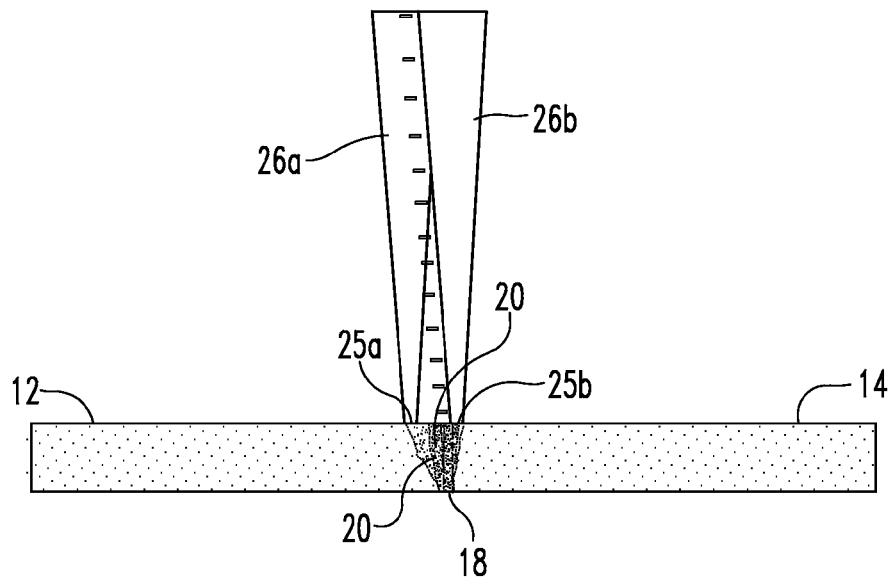
FIG. 2 is a schematic side view depicting a known method of welding dissimilar material with the relative small diameter spot of a fiber laser.

FIG. 2 shows a conventional application of a fiber laser to accomplish a similar welding application. Because the fiber laser beam 26 is focused to a much smaller spot size on the material, the laser beam 26 is steered across the material junction in a back and forth motion. The two beams 26a and 26b depict the positions of the beam 26 at the beginning and end of each pass, with beam 26a producing a spot 25a on the high melting point material 12 and beam 26b producing a spot 25b on the low melting point material.

Figure 4:
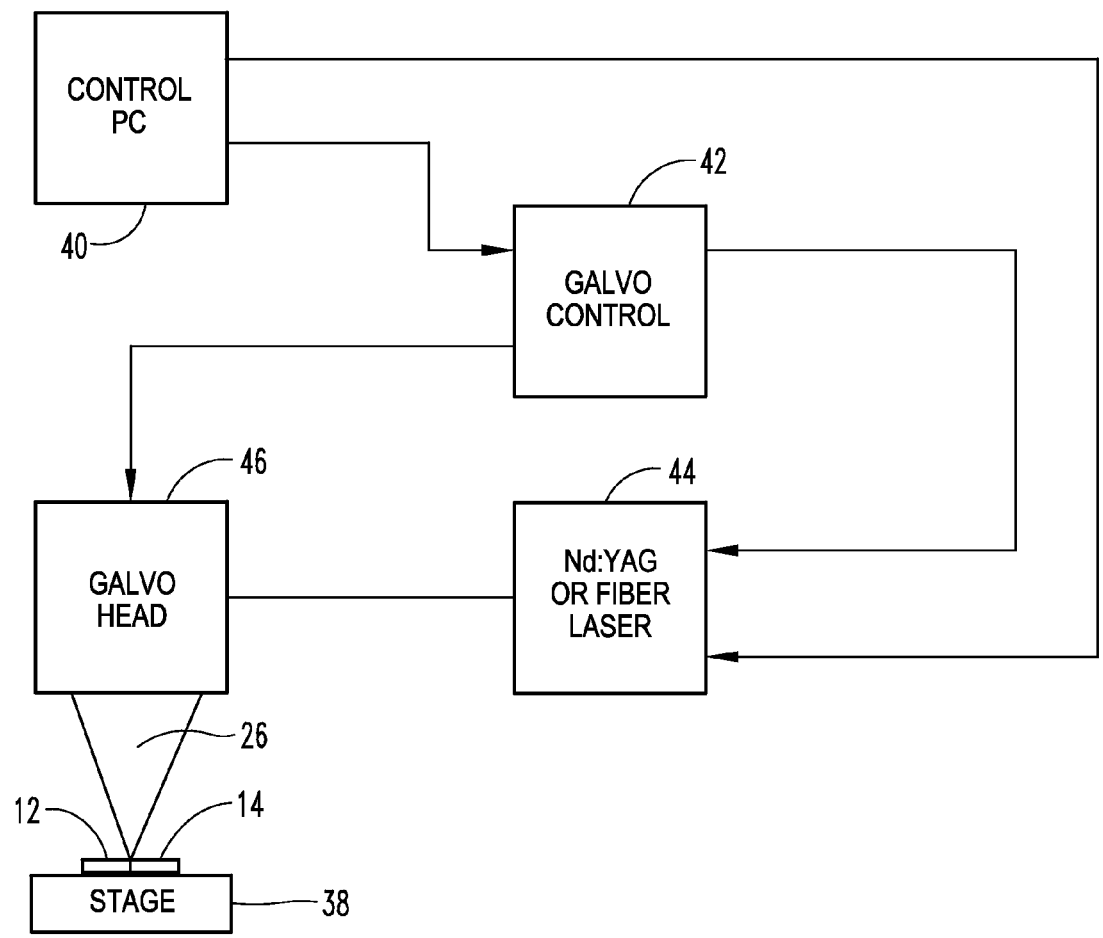
FIG. 4 is a schematic illustration of a known fiber laser welding system.

With reference to FIG. 4, the materials 12, 14 to be welded are typically mounted on an indexing stage 38 and the beam 26 generated by the laser 34 is steered using a galvo head 36 or similar beam steering optics. A system control PC 30 is used to define the shape of each pulse and the pulse repetition rate as well as the list of moves for the galvo head 36. The galvo moves are sent to the galvo controller 32 and the pulse shape and pulse frequency rate are sent to the laser 34 via an Ethernet or similar digital connection. When the parts are in their correct position, the galvo controller 32 sends control signals to move the galvo head 36 according to the programmed list of moves. When those moves require laser power, the galvo controller 32 sends a signal to the fiber laser 34 to open the shutter or otherwise commence releasing the pulses at the specified rate, and then to shut of the laser power the galvo controller 32 sends a signal to close the shutter or otherwise stop releasing the laser pulses.

Figure 3:
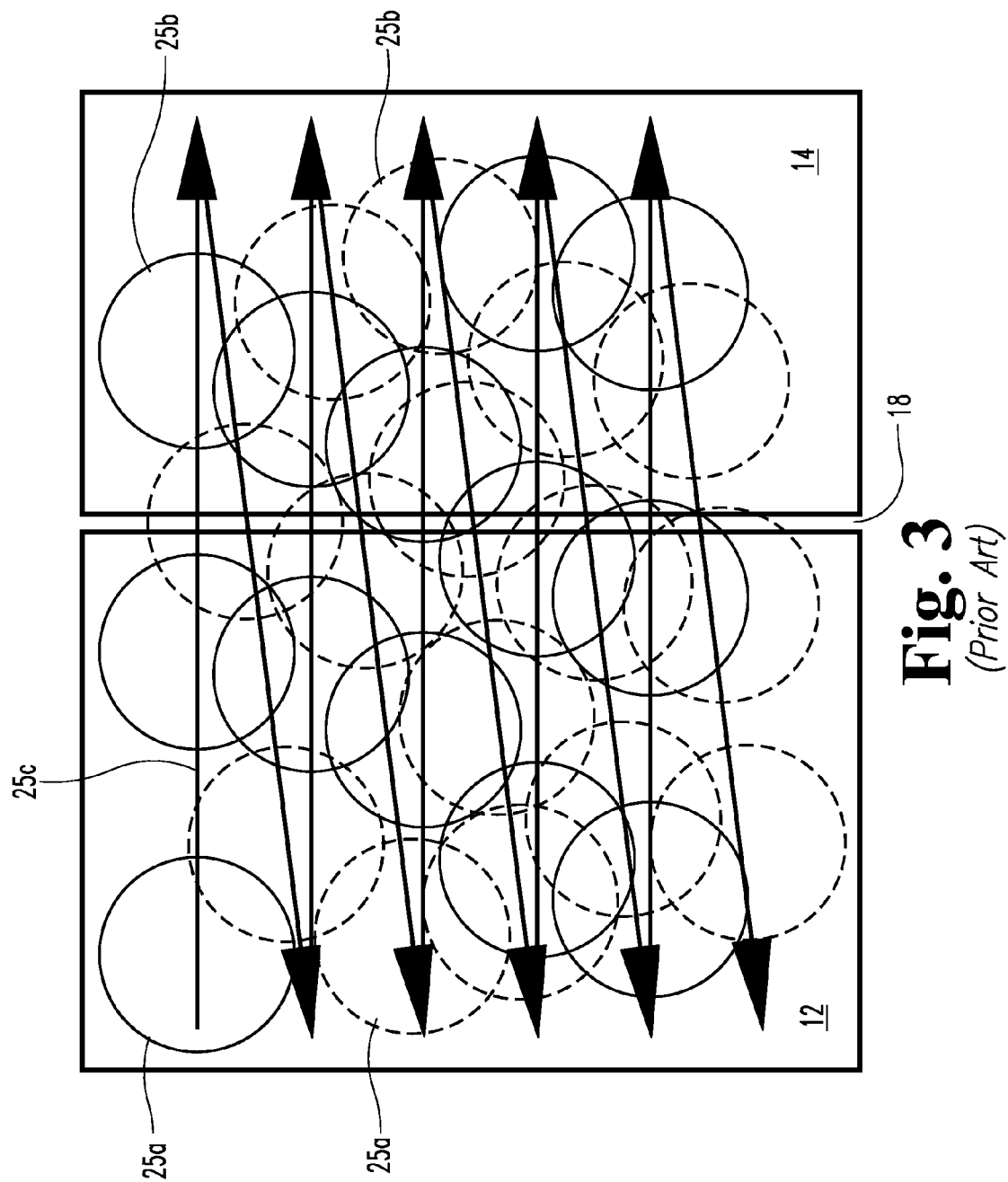
FIG. 3 is a schematic top view showing the distribution of the laser pulses during the know method of welding of FIG. 2.

In this way, a series of short duration laser pulses impact the materials at a fixed frequency along a zig zag beam path traced by the movement of the galvo head 36. The resulting distribution of spots is shown in FIG. 3, which depicts a top view of the materials with arrows indicating the zig zag beam path and the circles representing the spots where each laser pulse lands. It is to be understood that, because the speed of the galvo head is slow relative to the duration of each pulse, each of the spots 25*a*, 25*b*, 25*c* are shown as circular, but in practice each spot may have a slight oval shape. The zig zag pattern extends further into the high melting point material 12 than the low melting point. Therefore, while some of the spots 25*a* land entirely on material 12, some of the spots 25*b* land entirely on material 14, and some of the spots 25*c* traverse the junction or gap 18 between the materials 12 and 14, a greater number of spots are incident on the higher melting point material 12. Accordingly, even though the laser intensity in each spot 25*a*, 25*b*, 25*c* is equal, a greater amount of laser energy is delivered into the higher melting point material 12 to compensate for its higher melting point. However, because the spots extend further into the higher melting point material, more of that material tends to be melted, yielding a weld pool 20 that tends to be asymmetric.

Figure 8:
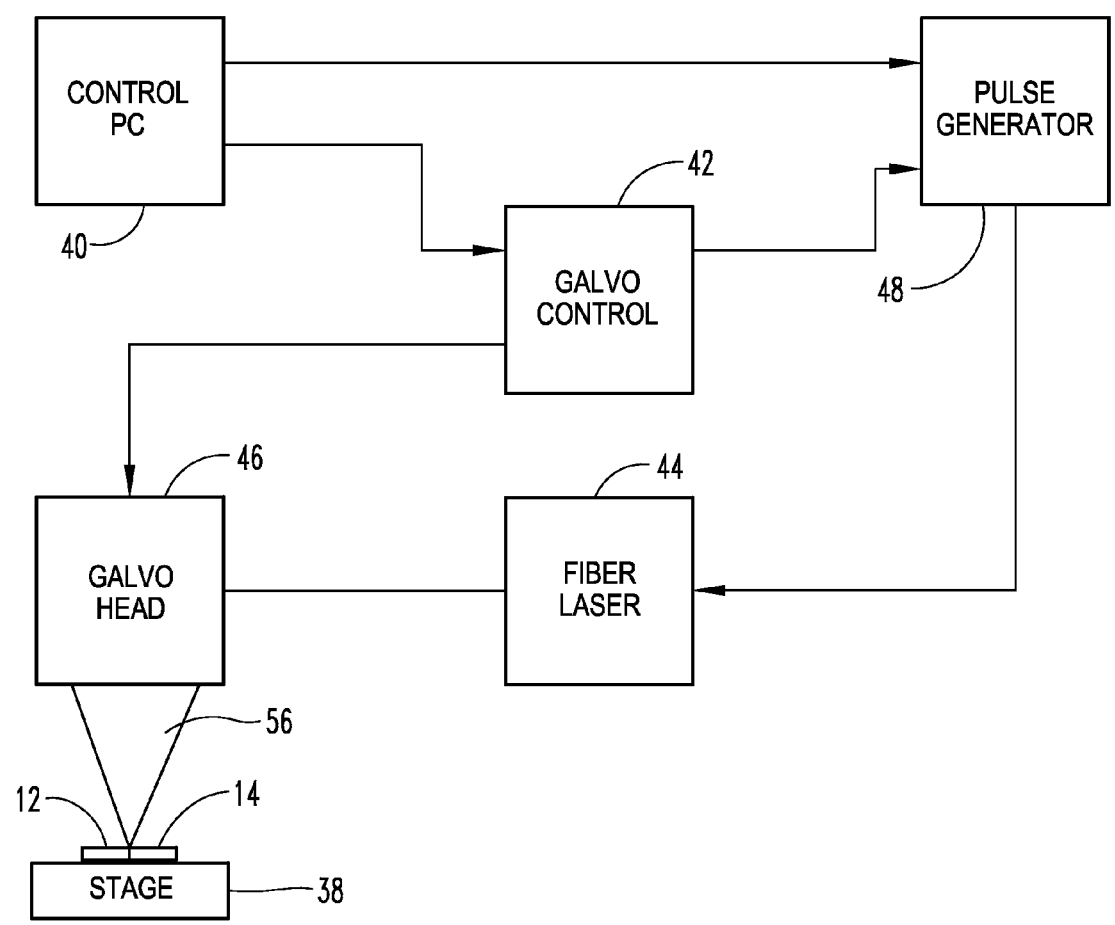
FIG. 8 is a schematic illustration of a fiber laser welding system according to an embodiment.
Figure 9:
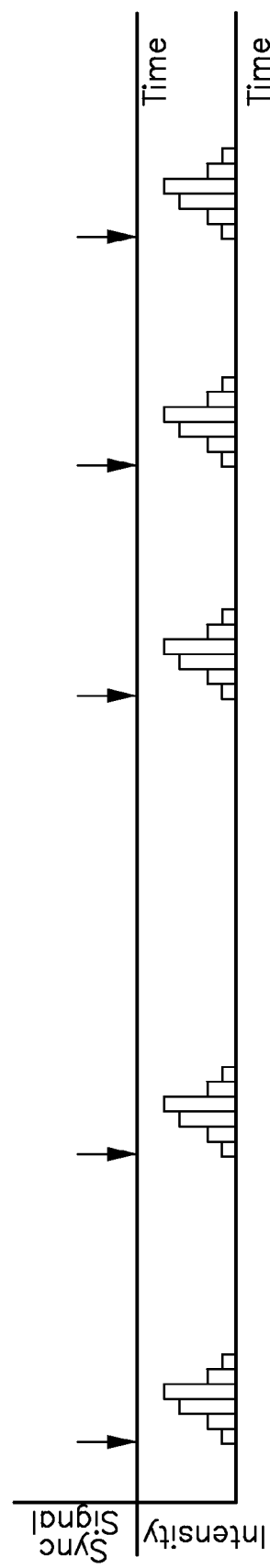
FIG. 9 is a plot showing the pulse initiation signals and laser intensity profiles versus time according to an embodiment.

FIG. 8 shows a laser welding system 41 according to an embodiment of the present invention. A control PC 40 has an interface that allows the user to input a desired pulse shape, and this pulse shape is then programmed into a pulse generator 48 coupled to a fiber laser 44. The pulse generator 48 is configured to generate pulses on demand. In other words, unlike conventional fiber laser pulse generators that create shaped pulses at a specified pulse repetition rate, the pulse generator 48 is designed to generate a single pulse having the desired shape upon receipt of a pulse initiation signal. This is illustrated in FIG. 9, which shows the relationship of the pulse initiation signals, or pulse sync signals, with the resulting intensity output from the laser. In order to minimize the time lag between receipt of the pulse initiation signal and the output of the laser pulse, the pulse generator 48 may be in the form of a field programmable gate array (FPGA) that receives the pulse initiation signal digitally and essentially instantaneously generates the appropriate analog signal to cause the fiber laser 44 to output a laser pulse having the specified intensity profile.

The control PC 40 also provides for the input of the list of moves defining how and where those pulses are to be placed on the work piece, and this information is then sent to the galvo control 42. During operation, the galvo controller 42 sends beam steering signals to move the galvo head 46 according to the predetermined list of moves, and the controller 42 sends pulse initiation signals to the pulse generator 48 that are synchronized with the galvo moves. As a result, the pulses fired by the fiber laser 44 are synchronized with specified movements of the galvo head 46 such that the energy from each pulse is spread across a predetermined area of the workpiece. Preferably, the speed of the galvo movement is fast relative to the duration of the respective pulse such that the energy from the pulse is spread across an area of the workpiece having a high aspect ratio, for example, an area having a length that is at least 2, 3, 4, or 5 times its width.

Figure 5:
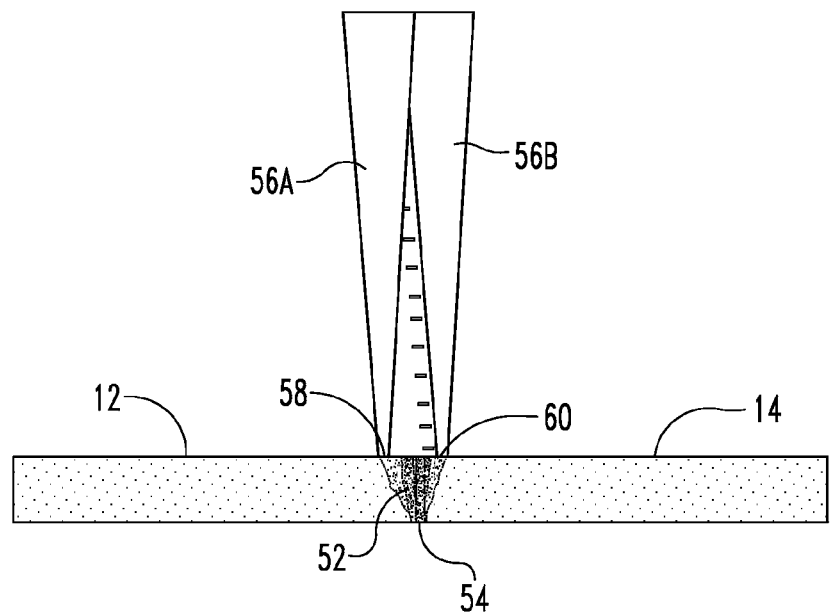
FIG. 5 is a side view showing a method of welding with a fiber laser according to an embodiment.
Figure 6:
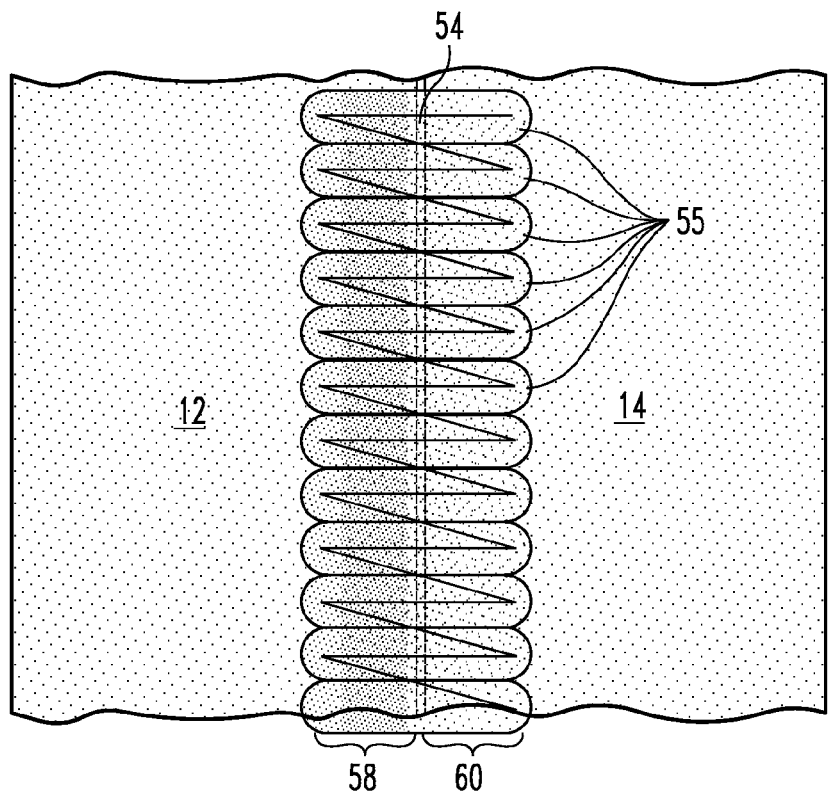
FIG. 6 is a top view showing the continuous high aspect ratio areas on parts welded according to an embodiment.
Figure 7:
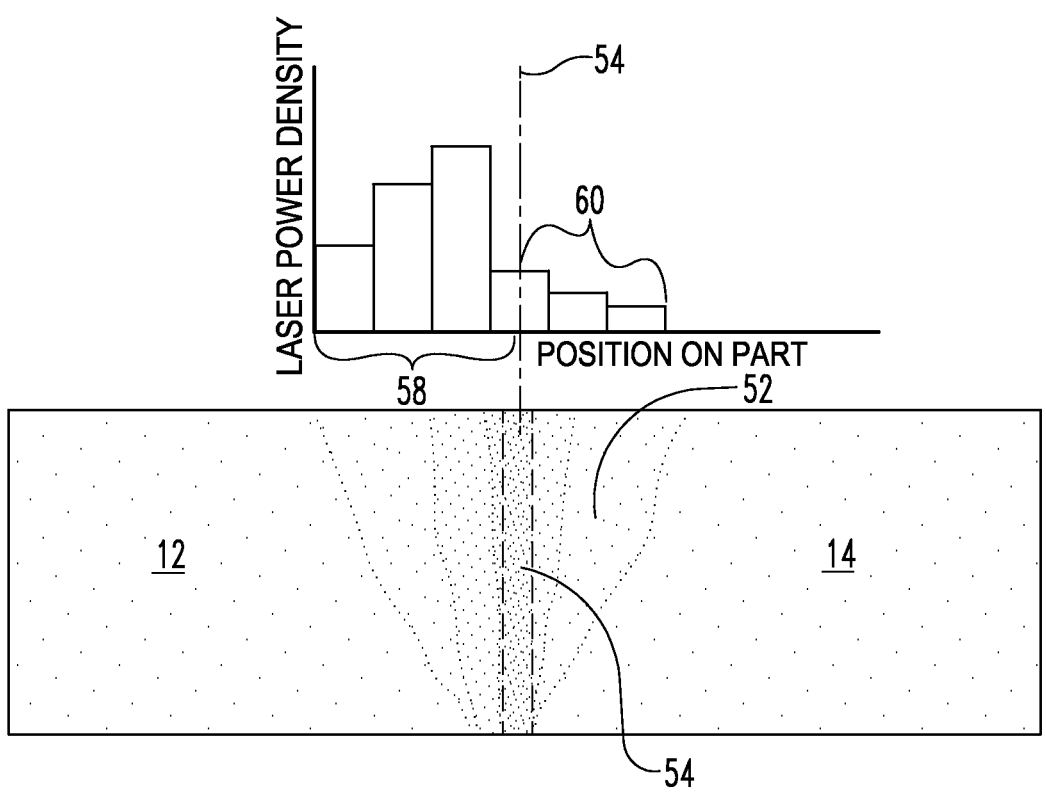
FIG. 7 is an enlarged view of the weld pool of FIG. 5 superimposed with a plot correlating the laser power density applied to the various positions on the workpiece.

With reference to FIGS. 5, 6 and 7, in one preferred implementation a pulse is generated as the laser beam 56 is swept from position 56A to position 568 such that the energy from the pulse is spread across a continuous high aspect ratio area 55 that traverses the material junction 54. The area 55 has an elongated portion 58 that extends onto material 12 and an elongated portion 60 onto material 14, and the intensity of the laser is varied during the pass according to the intensity profile shown in FIG. 7. The galvo then moves to the next location along the junction 54 and another pulse is generated while the beam 56 is again swept across the junction in the same manner, again depositing the laser energy according to the intensity profile shown in FIG. 7 across another elongated portion 58 of material 12 and another elongated portion 60 of material 14. The process repeats until the pulses have been spread along a series of the elongated areas 55 to cover the desired weld zone.

As shown in FIG. 6, each of these elongated areas 55 are symmetrically aligned along the junction, with each of the elongated portions 58, 60 extending into the respective materials 12, 14 similar amounts. In the illustrated embodiment, the diameter of the beam is maintained constant during each pass, and thus the overall area of each of the elongated portion 58, 60 on each material 12, 14 receiving laser power is approximately equal. However, due to the variation in the intensity level of the laser during each stroke, which varies along the part position as shown in FIG. 7, the power density applied to each of the materials is different, with a lower power density being applied to the lower melting point material 14, and a higher power density being applied to the higher melting point material 12. Applying substantially unequal power densities over substantially equal areas of each material ensures that similar amounts of each material is melted, resulting in a weld pool 52 that is substantially symmetric.

The variation in power densities applied to each material 12, 14 is selected to accommodate the different thermal characteristics of each material and may vary in proportion to those differences. Accordingly, in applications where the thermal characteristics of the material are substantially different, the power density applied to each material may be substantially different, for example, differing by 25%, 40%, 50%, or 75%.

The intensity profile shown in FIG. 7 is in the form of a stair step pattern. This pattern is configured such that there are three sectors of sequentially increasing intensity as the laser moves from left to right along the high melting point material 12 towards the material junction 54. The intensity level steps down as the laser traverses the gap at the material junction 54, and then there are three sectors of sequentially decreasing intensity as the laser moves from the material junction 54 into the lower melting point material 14. As illustrated, the length of each of the sectors is generally equal, resulting in a gradually increasing intensity profile on material 12 and a gradually decreasing intensity profile on material 14. This gradual ramp up and ramp down of the laser power at the beginning and end of the laser pulse helps to reduce pitting and porosity.

The ability to quickly reduce laser power at the point that the laser beam begins interacting with the more fragile material prevents unwanted perforation or ablation and ensures a more uniform weld. As illustrated, the step down in intensity at the material junction may be offset slightly towards the higher melting point material 12. This is done to provide a margin of error to avoid the highest laser intensity of the pulse impacting the more fragile material 14, thereby further reducing the chance that there would be unwanted obliteration or piercing of the more fragile material.

Figure 10:
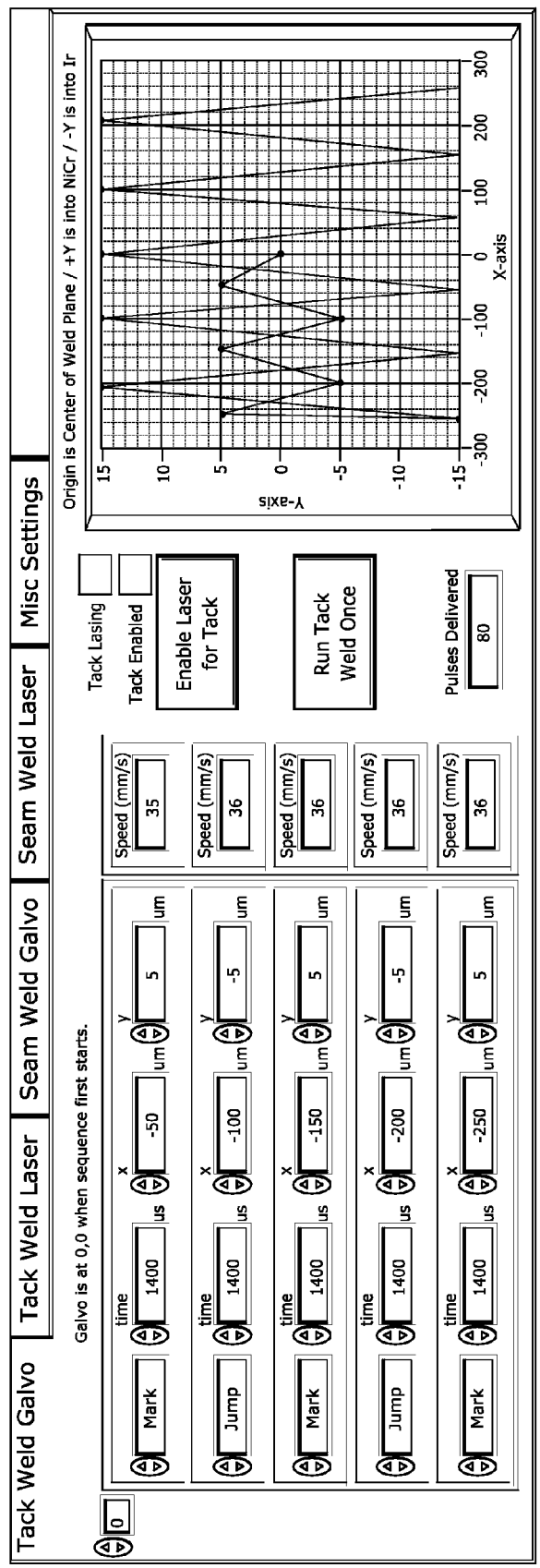
FIG. 10 is an illustration of an input screen for receiving the user specified series of moves according to an embodiment.
Figure 11:
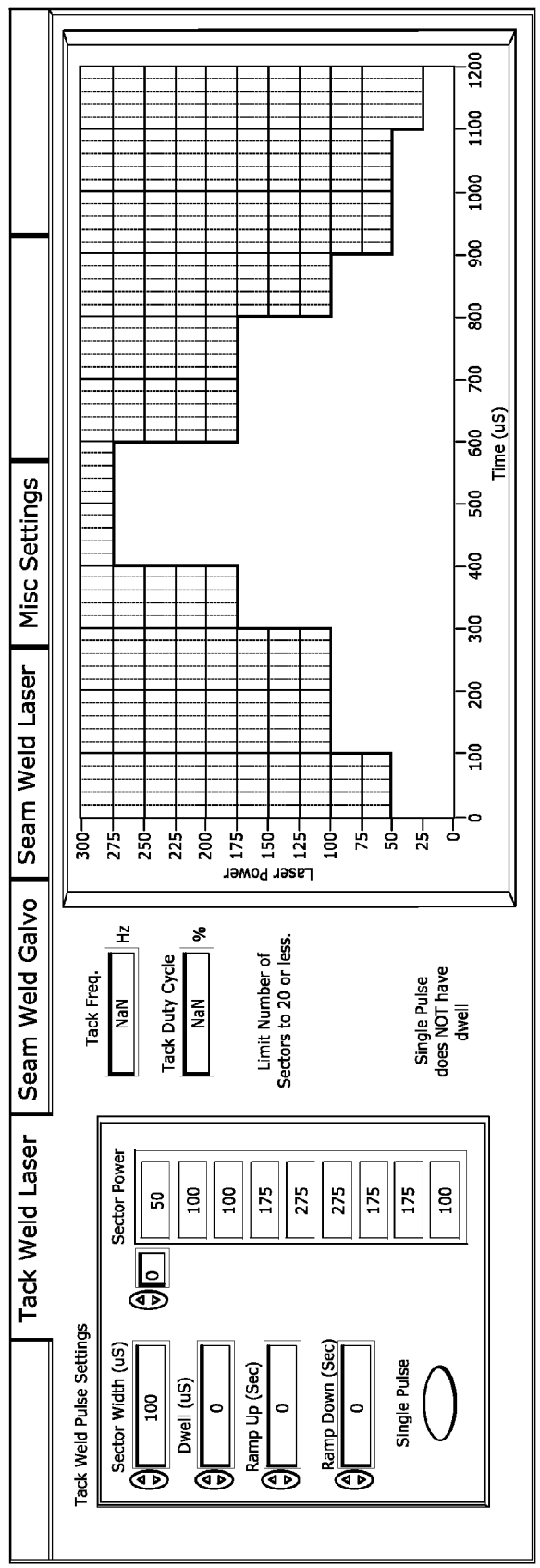
FIG. 11 is an illustration of an input screen for receiving the user specified laser intensity profile according to an embodiment.

FIG. 10 shows a screen shot of the input screen the user uses for inputting the list of galvo moves and for designating whether or not laser power is to be applied during the move. The intensity profile for the pulse to be applied is set via the input screen shown in FIG. 11. As illustrated, the duration of each pulse is 1200 μs and is divided into 100 μs sectors, with the power of each sector able to be set independently. The resulting plot of laser power versus time is displayed in the graph on the right side of FIG. 11

Turning back to FIG. 10, the galvo begins at (0,0) with the x-axis representing the material junction. Each galvo moves may be designated as either a "mark" move, which involves the application of laser power during the move, or a "jump" move which does not. The user inputs the duration of each move and the ending coordinates for each move, and the software calculates a constant speed for the galvo head to accomplish the move in the specified time. As illustrated, each of the moves is set to occur in 1400 µs, which is slightly longer than the duration set for each pulse. Delaying the initiation of each pulse can be used to compensate for inertial effects of the galvo movement.

Lines showing the galvo path for the series of moves is shown in the graph on the right side of the screen in FIG. 10. As illustrated, the initial moves zig-zag across the material junction and penetrate 5 µm into each material, for example going from (−50, 5) to (−100, −5), and the later moves penetrate 15 µm into each material, for example going from (−250, −15) to (200,15). Because each of the moves are set to the same duration, the speed at which the laser moves during the later set of galvo moves (i.e. the longer passes across the material junction) is greater than the speed of the laser during the initial moves (i.e. the shorter passes across the material junction). As a result, during the initial moves, when the part is cold, the power from each pulse is concentrated in a smaller area than in the later moves, when the temperature of the part has become elevated due to retained heat from the earlier mark moves. Thus, because the laser pulse delivered during each mark move is the same, the power density delivered to the part during these initial moves is greater, which serves to "pierce" the material and begin the weld process. Then, during the later moves, as the part has retained some of the heat from the earner moves, the reduced power density resulting from spreading the pulse over a larger area is sufficient to continue the weld process without destroying the weld junction.

Because the laser is being moved at a fixed rate during each individual pass while the output intensity of the laser is varied according to the specified intensity profile, the power density applied to different portions of the part varies in accordance with the variation in the laser intensity profile. This precise control of the power density being applied at different points around the weld junction allows the creation of welds with greatly improved weld quality. Alternatively, one could control the power density applied during a pass by altering the speed of the laser during the pass. For example, rather than having the laser output increase as the beam moves towards the junction and then decrease as it moves away from the junction to achieve, the speed of the laser could decrease as it approaches the junction and increase as it moves away from the junction. Alternatively, both the speed and the output intensity of the laser could be varied during a pass.

Furthermore, rather than applying the same pulse shape (i.e. intensity profile) during each mark move of the laser, different pulse shapes can be predefined and associated with different moves of the galvo head. In this case, the controller would be configured to send synchronized pulse initiation signals that specify which pulse shape to apply during a specified move. For example, one set of pulse shapes could be applied during the initial set of short passes across the material junction shown in FIG. 10, with another set of pulse shapes applied during the longer passes across the material junction. Similarly, rather than having the laser make a jump move so as to always apply a pulse while moving in the same direction across the junction (i.e. from the higher melting material to the lower melting material), one pulse profile could be selected during moves in one direction and another pulse profile could be selected when moving in the opposite direction.

The pulses need not be spread across the junction on each move. For instance, it some applications, it may be desirable to jump a significant distance from the junction into the high melting part, and then to jump back to spreading a series of pulses across the junction It is also to be understood that a pulse profile need not be continuous and that there can be small gaps or periods of low or no intensity interspersed within each pulse without departing from the spirit of the present invention.

Example

A laser welding system according to FIG. 8 was created using the following components:

System PC: Core systems USA 20132-4U006.01 rack mount PC with touchscreen display Galvo Control: Cambridge Tech SM1000S-15-5 Galvo control with 5 m cables Galvo Head Cambridge Tech 61725PSXY2-YP Galvo scan head; Cambridge Tech P0075-0010 (Linos 4401-288-000-20) 254 mm lens; Cambridge Tech 720-80437-05-5 Scan head spacer plate Fiber laser: IPG YLR-300-AC-Y11 300 W fiber laser; IPG P45-003757 5 m armored fiber to QBH connector Pulse Generator: National Instruments 781502-01 NI-9148 Ethernet Rio Exp Chassis; National Instruments 779351-01 #9401 8-CH TTL DIO 100 nS module; National Instruments 779012-01 #9263 4Ch analog output module Programming software: National instruments labVIEW 12.0; National Instruments LabVIEW FPGA module; Cambridge Tech Universal API with LabVIEW drivers.

The system was used to weld a metal alloy having a melting point of 2410° C. to a metal alloy having a melting point of 1455° C. The pulses were spread over an area that extended 15 µm into each material. Upon completion, the parts were examined and a substantially uniform weld pool was observed with similar amounts of each material having been melted.

Any theory, mechanism of operation, proof, or finding stated herein is meant to further enhance understanding of embodiment of the present invention and is not intended to make the present invention in any way dependent upon such theory, mechanism of operation proof, or finding. In reading the claims, it is intended that when words such as "a," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiment of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A method of laser welding, comprising:
   steering a laser beam in a series of passes across the junction between first and second materials, wherein during each of the passes the laser power is applied across a continuous high aspect ratio area that traverses the junction, wherein the high aspect ratio area for each pass comprises a first elongated area on the first material and a second elongated area on the second material; and
   varying the power density that is applied during each pass in a predetermined manner such that the average power density that is applied to each of the first elongated areas is different from the average power density that is applied to each of the second elongated areas so as to compensate for different thermal characteristics of the materials.

2. The method of claim 1 wherein during each pass the average power density applied to the first elongated areas is at least 25% greater than the average power density applied to the second elongated area.

3. The method of claim 1 wherein varying the power density comprises varying the speed at which the beam moves across the high aspect ratio area.

4. The method of claim 1 wherein varying the power density comprises varying the intensity of the laser beam as the beam moves across the high aspect ratio area.

5. The method of claim 1 wherein the first elongated area has an elongated length that is within about 25% of the corresponding elongated length of the second elongated area.

6. The method of claim 5 wherein the first elongated area has an elongated length that is within about 10% of the corresponding elongated length defined by the second elongated area.

7. The method of claim 1 wherein the size of the first elongated area is within about 25% of the size of the second elongated area.

8. The method of claim 1 wherein the average power density applied to the half of the first elongated area that is furthest from the junction is less than 70% of the average energy density applied to the other half of the first elongated area that is nearest the junction.

9. The method of claim 8 wherein the average power density applied to the half of the second elongated area that is furthest from the junction is less than 50% of the average energy density applied to the half of the second elongated area that is nearest the junction.

10. A system for applying laser energy to a workpiece, comprising:
    a fiber laser pulse generator operative to generate fiber laser pulses according to a user specified intensity profile upon receipt of a pulse initiation signal;
    beam steering optics operative to spread the laser pulses across high aspect ratio areas of the workpiece; and
    a controller coupled to the beam steering optics and to the pulse generator, wherein the controller is operative to send a series of pulse initiation signals to the fiber laser pulse generator that are synchronized with a series of beam steering signals sent to the beam steering optics so as to cause the laser pulses to be spread along a series of predetermined high aspect ratio areas of the workpiece.

11. The system of claim 10 wherein the fiber laser pulse generator is operative to generate different fiber laser pulses according to different user specified intensity profiles upon receipt of different pulse initiation signals.

12. The system of claim 10 further comprising an input device for receiving a user specified series of moves for the beam steering optics and the user specified intensity profile to be applied during specified moves in the series of moves.

13. The system of claim 12 wherein the fiber laser pulse generator comprises a field programmable gate array in analog communication with a fiber laser.

14. The system of claim 13 wherein the input device comprises a control computer that is in digital communication with the field programmable gate array and the controller.

15. The system of claim 10 further comprising a workpiece mounted on an indexing stage, wherein the workpiece comprises two materials to be welded and the high aspect ratio areas traverse the junction between the two materials to be welded.

16. A laser welding system for dynamically varying the laser power density applied to different sides of a material junction, comprising:
    an input device for receiving a user specified series of moves for a fiber laser beam across a material junction and one or more varying intensity profiles for the laser beam to be applied during specified moves in the series of moves;
    a fiber laser configured to generate a laser beam according to the one or more varying intensity profiles upon receipt of a corresponding laser initiation signal;
    beam steering optics for moving the generated laser beam; and
    a controller configured to send the laser initiation signals to the fiber laser and to operate the beam steering optics so as to move the laser beam across the junction according to the specified series of moves, wherein the laser initiation signals are synchronized with the operation of the beam steering optics such that the laser power density applied on one side of the material junction is greater than the laser power density applied on the other side of the material junction.

17. The laser welding system of claim 16 wherein the controller is configured such that while the laser is being applied the speed of the laser decreases as it moves towards the junction and increases as it moves away from the junction.

18. The laser welding system of claim 16 wherein the controller is configured such that while the laser is being applied the intensity of the laser increases as the beam approaches the junction and decreases as it moves away from the junction.

19. A method for laser welding comprising:
    generating a series of varying intensity beams from a fiber laser; the beams having an asymmetrical intensity profile comprising an increasing intensity region, a central region of high intensity, and a decreasing intensity region; and
    spreading the series of beams across a material junction such that a majority of the increasing intensity region of each beam falls on one side of the junction and a majority of the decreasing intensity region of each beam falls on the other side of the junction.

20. The method of claim 19 wherein the central region of each beam is generally aligned with the junction.

21. The method of claim 19 wherein the beam is spread across a high aspect ratio area comprising a first elongated area on one side of the junction and a second elongated area on the other side of the junction, wherein the size of the first and second elongated areas are within 25% of each other and at least 25% more power is applied in the first elongated area than in the second elongated area.

22. The method of claim 21 wherein at least 40% more power is applied in the first elongated area than in the second elongated area.

* * * * *